R. B. LONG.
LIFTING JACK.
APPLICATION FILED MAY 5, 1917.
1,265,219.
Patented May 7, 1918.
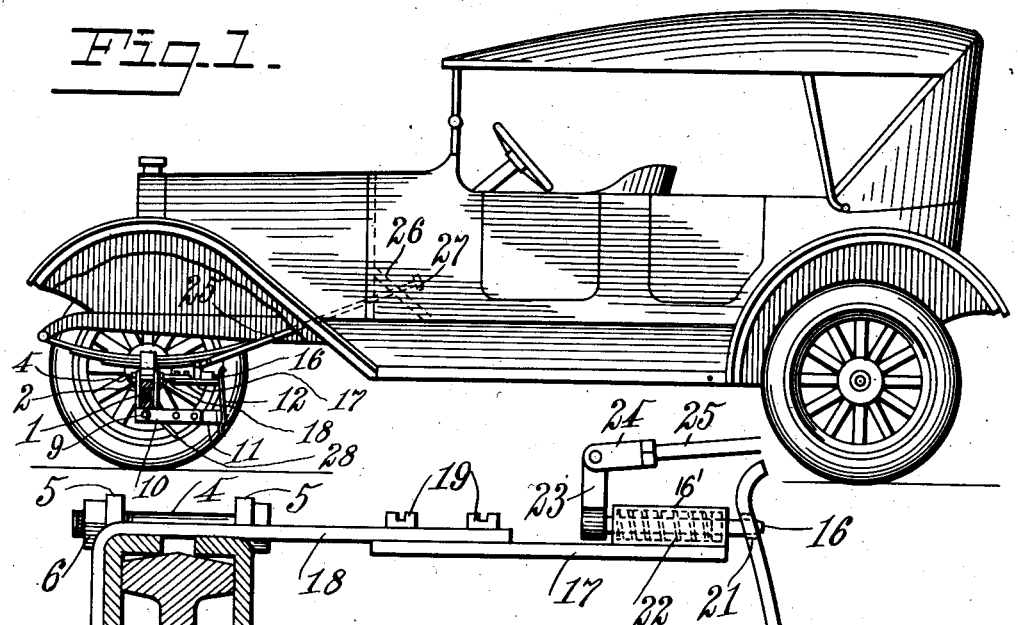
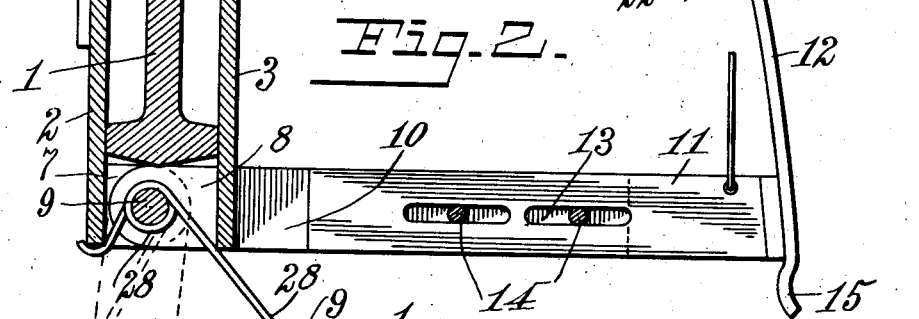
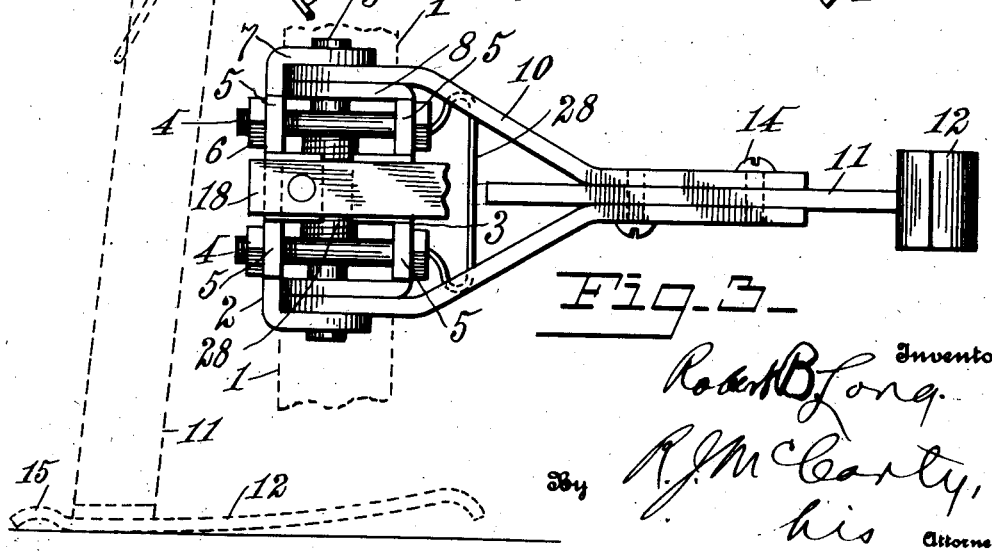
Inventor
Robert B Long.
By R. J. McCarty,
his Attorney

UNITED STATES PATENT OFFICE.

ROBERT B. LONG, OF DAYTON, OHIO.

LIFTING-JACK.

1,265,219.    Specification of Letters Patent.    Patented May 7, 1918.

Application filed May 5, 1917. Serial No. 166,737.

*To all whom it may concern:*

Be it known that I, ROBERT B. LONG, citizen of the United States, residing at Dayton, in the county of Montgomery and State of Ohio, have invented certain new and useful Improvements in Lifting-Jacks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a form of lifting jack designed to be affixed to an automobile and to be given its lifting operation independently of manual labor. The said lifting device owing to its peculiar adaption is mounted on a convenient part of the running gear of the vehicle, in the present case, the running gear of an automobile, for example, the axle thereof. When not actually employed to raise the wheels from the ground, it is out of the way, and when needed for lifting the vehicle it may be placed in an operative position with slight effort on the part of the driver of the machine. The main object of the invention is to provide a lifting device so affixed to the vehicle that the latter may be lifted from the ground by slightly backing the machine under its own power as will more fully appear from the description to follow in connection with the accompanying drawings.

Referring in general terms to the accompanying drawings, Figure 1 is a side elevation of an automobile to which my improved lifting jack is applied. Fig. 2 is an enlarged sectional view of the automobile axle. The lifting device is also shown in this view, a portion of which appears in section. Fig. 3 is a top plan view of the lifting device as shown in Fig. 2.

In a detail description of my invention in connection with the accompanying drawings similar reference characters will denote corresponding parts in both the drawings and the description.

The lifting device as before stated is especially designed and adapted for automobiles and is attachable to the axle 1 thereof in a central position so that both wheels of the vehicle may be elevated at the same time. The said lifting device is constructed especially with a view to firmly attaching it to said axle 1 and it consists of a clamp formed of two plates 2 and 3 which embrace opposite sides of the axle and extend over the top thereof. The said plates 2 and 3 are clamped to the axle by means of bolts 4 which penetrate alined openings in ears 5 which extend from the upper portions of said plates. The bolts 4 have heads and the ends thereof receive nuts 6 by which said bolts are tightened to clamp the plates to the axle. The lower ends 7 and 8 of said plates overlap each other and are provided with alined openings which receive a pin 9. The said pin performs a double function, to wit, that of uniting the bottom ends of the plates 2 and 3 in the form of a clamp, and that of a pivot for the bifurcated leg 10. While I have with some particularity described the means of affixing the lifting device to the axle of the automobile, it will be obvious that such means may be varied from those shown and described. As before stated, the part 10 of the supporting leg is fulcrumed on the pin 9. It may be dropped by its own weight from the horizontal position shown in Fig. 2 to the supporting position shown in broken lines in said Fig. 2. In the present case the leg 10 is shown to be forked, the spreading ends thereof receiving the pin 9. The converging ends thereof clamp between them the shank 11 ends to the lower end of which a shoe 12 is attached. The shoe 12 engages the ground when the device is lowered to the broken line position as shown in Fig. 2. The said shoe 12 may be adjusted relative to its distance from the axle 1. For this purpose the shank 11 has oblong slots 13 therein through which screws 14 pass, said screws also passing through alined openings in the converging portions of the leg 10. It will be readily seen that the screws 14 provide means for clamping the parts firmly together when once adjusted. The forward end 15 of the shoe 12 is suitably formed to enable it to grip the ground when the leg 10 is lowered and the automobile is slightly backed as in the act of elevating the wheels from the ground. It will be understood that the length of the leg 10 including the shank 11 is greater than the distance of the axle 1 from the ground and that therefore when the automobile is backed a sufficient distance the wheels will be elevated from the ground. When not lowered the leg 10 including the shank 11 and shoe 12 are held up in the horizontal position by means of a plunger 16 mounted upon an arm 17 which is adjustably supported upon a connected arm 18 extending from the top of the clamp plates 2 and 3. The length of the arm 17 may be regulated by screws 19 by means of which said arm 17 is affixed to the arm 18. The plunger 16 is mounted in a casing 16' secured to the arm 17 and the ends of said plunger project beyond the ends of said casing. The rearward projecting end thereof penetrates an opening 21 in the rearward end of the shoe 12. A spring 22 surrounds said plunger 16 and holds it out in a position in which it engages the shoe by snapping into the opening 21. Attached to the other end of the plunger 16 is an arm 23 to which is pivoted a head 24 from which extends an operating rod 25. The rod 25 passes through a suitable opening in the foot board 26 of the automobile, and the end of said rod so projected through said foot opening is provided with a treadle portion 27 arranged to be conveniently pressed by the foot of the driver to remove the plunger 16 from the opening 21. When so pressed the effect of the operation is to permit the shoe 12 to drop to the ground. This being accomplished, a slight backing of the automobile under its own power will bring the leg 10 to a substantially perpendicular position and thus the wheels of the vehicle will be elevated from the ground as before stated. When it is desired to release the device from its supporting position a slight forward movement of the automobile will cause the leg 10 to move rearward and out of a supporting position. In this event the said leg 10 together with the shoe 12 is raised by a spring 28 to the horizontal position and the shoe 12 is brought to a position to permit the plunger 16 to snap into the opening 21 in said shoe. The spring 28 is coiled around the pin 9 one end thereof being held by the plate 2 and the other end engages the lower side of the leg 10 and exerts an upward force on said leg. When the automobile has been moved forward to dislodge the axle 1 from the supporting position, the impetus given the leg 10 adds to the lifting capacity of the spring 28 and the said leg is elevated to a position to enable the plunger 16 to snap into the opening in the shoe 12. It will be understood that when the leg 10 is moved to the supporting or perpendicular position as shown by the broken lines Fig. 2 by a forward movement of the automobile, the spring 28 is under a maximum of tension and when the leg is moved rearwardly by the backing of the automobile the spring exerts its greatest force to raise said leg.

Having described my invention, I claim:

In a lifting jack for automobiles, the combination with an axle, a bifurcated leg pivotally connected with said axle, a shank having an adjustable connection with said leg, a shoe attached to said shank and having an extended portion with an aperture therein, a rigid arm connected to the automobile frame above the axle, an adjustable arm connected to said rigid arm, a spring-engaged plunger mounted on said adjustable arm in a position to enter the aperture in the shoe and to hold said shoe in the raised position, and means connected with said plunger for releasing it from engagement with the shoe.

ROBERT B. LONG.

Witness:
MATTHEW SEIBLER.